Jan. 9, 1940.  A. DE M. RIGGS  2,186,498
VEHICLE DIRECTION INDICATOR
Filed Oct. 5, 1937
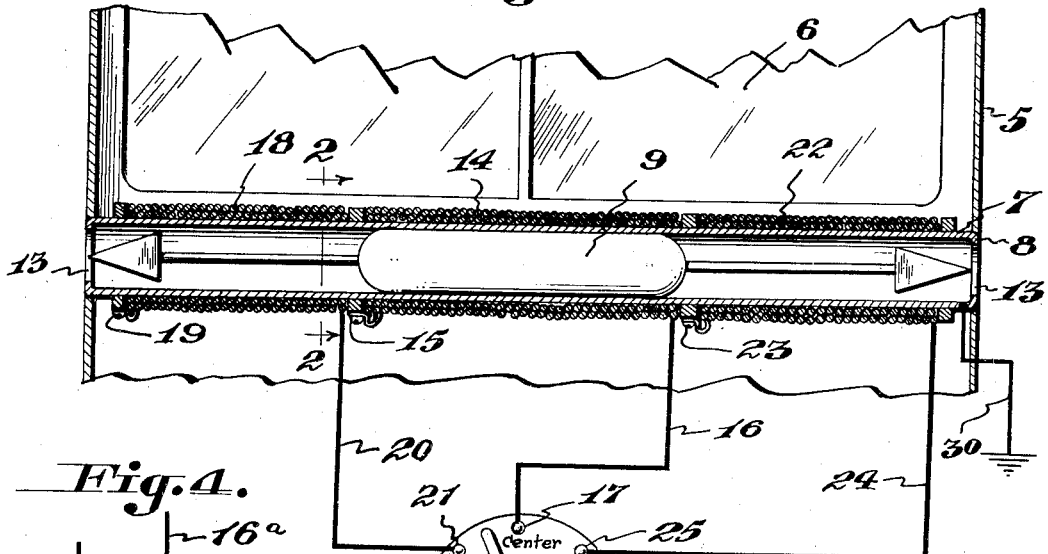
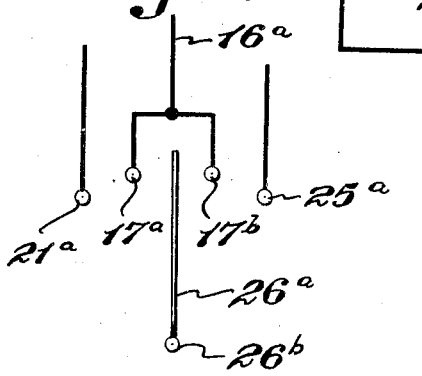
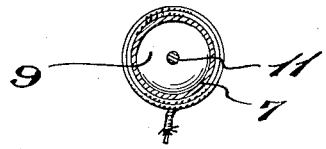
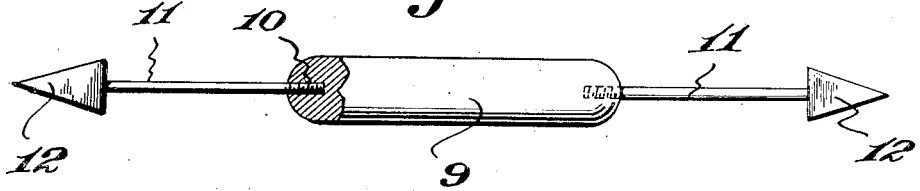
Inventor:
A. de M. Riggs
By Seymour, Bright & Nottingham Patented Jan. 9, 1940

2,186,498

UNITED STATES PATENT OFFICE 2,186,498

VEHICLE DIRECTION INDICATOR

Amalia de Murguiondo Riggs, Washington, D. C.

Application October 5, 1937, Serial No. 167,430

1 Claim. (Cl. 175—335)

This invention relates to improvements in direction indicators for automobiles and more particularly to such indicators of the type actuated or controlled by solenoids.

It has heretofore been proposed to employ solenoids for projecting signalling arrows or the like from the body of a motor vehicle, and after making a study of such devices, I have conceived of ways of greatly simplifying and decreasing the cost of such structures.

The primary object of my invention is to furnish a direction indicator controlled in its entirety by solenoids; to eliminate the use of springs or the like for retracting the signalling arms; and to simplify and render less expensive the manufacture and installation of such devices.

With the foregoing object outlined and with other objects in view which will appear as the description proceeds, the invention consists in the novel features hereinafter described in detail, illustrated in the drawing, and more particularly pointed out in the appended claim.

In the drawing:

Fig. 1 is a fragmentary view of a portion of an automobile equipped with my improved direction indicator which is illustrated partially in elevation and partially in longitudinal vertical section.

Fig. 2 is a cross sectional view taken on line 2—2 of Fig. 1.

Fig. 3 is an elevation partly in section of the combined signalling arm and core portion of the structure.

Fig. 4 is a diagrammatic view of a modified form of switch to be employed in controlling the solenoids.

Referring to the drawing, 5 designates the body of an automobile provided with a conventional windshield 6, and while I prefer to mount the direction indicator immediately below the windshield so that the signalling arms may be projected laterally through openings in the opposite sides of the vehicle body, it will be obvious to those skilled in the art that the signalling device may be arranged at other locations on the vehicle.

For the sake of illustration some of the parts are shown enlarged or exaggerated, as in actual practice I prefer to use as a foundation, a piece of brass pipe 7, and such pipe is preferably of a length to extend across the automobile body and has its ends inturned to form annular flanges 8 to prevent either signalling arm from being projected too far. The pipe may have a bore slightly less than $\frac{7}{16}$ inch and an outer diameter of approximately $\frac{3}{8}$ inch. This is desirable as such pipe is a standard article that may be obtained for example, at any plumbing supply house.

Within the pipe I arrange a plunger 9 which snugly engages and slidably fits the bore of the pipe and is preferably made of a piece of soft iron rod. The ends of the plunger are preferably screw-threaded as shown at 10 in Fig. 3 to accommodate or engage the screw-threaded ends of signalling arms 11. The arms extend in opposite directions and may be of any suitable shape, for example, of arrow shape, and the heads 12 of the arrows are adapted to pass through the openings 13 in the ends of the tube so that either signalling arm when in projected position may be seen from the front or rear of the vehicle.

The ends of the core or plunger 9 are preferably rounded so that the plunger will promptly stop when either of its ends comes into contact with one of the flanges 8.

A coil 14 is wound about the central portion of the tube for the purpose of positioning the core at the center of the tube. One end of the coil is in electrical contact with the tube as shown at 15 and its other end is connected to a wire 16 that extends to a central contact 17 on a switchboard.

A solenoid for moving the core to the left is shown as including a coil 18 wound about the left end portion of the tube and electrically contacting with the latter at the point 19. A connection 20 joins this coil to a contact 21 on the switchboard.

The solenoid for moving the core toward the right comprises a coil 22 which is wound about the tube and has one of its ends in electrical connection with the tube at the point 23. The opposite end of the coil is connected by a wire 24 to a contact 25 on the switchboard.

An oscillating switch arm 26 on the board is connected by a lead 27 to the battery 28 of the car, and the battery and tube are grounded on the frame of the machine as indicated at 29 and 30.

The coils are preferably made of No. 22 wire, double cotton covered, and of course, each coil will contain a sufficient length of wire to perform the service for which the solenoid is designed. With the wire size given, each solenoid will take about 1.2 amperes from the battery, assuming a six volt storage battery, which is customary in automobile service.

In operation, it will be understood, if the switch arm 26 is brought into engagement with the contact 21, current from the battery will flow through the coil 18 with the result that the core 9 will be drawn toward the left so as to project the left signalling arm. Then by moving the switch arm over into engagement with the center contact, the core will be drawn to the central portion of the tube so as to bring the projected arm into the tube. Of course, if the arm 26 is brought into engagement with the contact 25, the core will be moved toward the right to effect a right-hand signal.

Instead of using the form of switch shown in Fig. 1, it may be of the type indicated in Fig. 4. In this event, the central coil wire 16a will have two contacts 17a and 17b so that the switch arm 26a may first be brought into engagement with the left contact 21a and then, on its return to neutral position, will contact 17a to return the core to neutral position. When a right turn is to be made, the switch arm may be brought into engagement with the contact 25a and then on its return will engage contact 17b to return the core to central position. In a switch of this type the arm 26a may be anchored at 26b and be made of resilient material whereby when it is released by the operator it would automatically return to the neutral position shown in Fig. 4.

What is claimed and desired to be secured by Letters Patent is:

In a device of the class described, a non-magnetic metallic tube, an electric coil wound on the outside of said tube near each end thereof and a third coil wound on the outside of said tube at the center thereof, a magnetic core slidable within said tube within the field of operation of each of said coils, stops at the ends of the tube for engaging said core to limit the movement thereof from its central position, each of said coils having one of its ends in electrical connection with said tube and the other of its ends connected to contacts disposed in positions corresponding to the placement of said coils, with the end of the center coil leading to a pair of medial contacts spaced from a central position, and an electric circuit for selectively energizing said coils comprising a source of electric energy and a switching device cooperating with said contacts to switch said energy source into circuit with one of said coils and thereby to control the positioning of said magnetic core, said switching device being formed as a resilient member tending normally to assume a neutral position between said medial contacts subsequent to the compulsory energization of said center coil following the energization of either of said end coils.

AMALIA de MURGUIONDO RIGGS.